(12) United States Patent
Maehara et al.

(10) Patent No.: US 7,280,908 B2
(45) Date of Patent: Oct. 9, 2007

(54) VEHICLE CONTROLLER AND VEHICLE CONTROL METHOD

(75) Inventors: Hiroaki Maehara, Hyogo (JP);
Masatoshi Hagiwara, Hyogo (JP);
Masato Ishio, Hyogo (JP); Akira Ikezoe, Hyogo (JP); Zenkou Oda, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 119 days.

(21) Appl. No.: 11/097,231

(22) Filed: Apr. 4, 2005

(65) Prior Publication Data

US 2005/0225175 A1 Oct. 13, 2005

(30) Foreign Application Priority Data

Apr. 12, 2004 (JP) ............................. 2004-117121
Dec. 27, 2004 (JP) ............................. 2004-377119

(51) Int. Cl.
*F02D 41/00* (2006.01)
*F02N 11/08* (2006.01)

(52) U.S. Cl. ........................ 701/113; 701/36; 123/179.2

(58) Field of Classification Search ...................... None
See application file for complete search history.

(56) References Cited

U.S. PATENT DOCUMENTS

| 4,345,554 | A |   | 8/1982  | Hildreth et al. |   |
|-----------|---|---|---------|-----------------|---|
| 4,464,659 | A |   | 8/1984  | Bergqvist       |   |
| 5,942,988 | A | * | 8/1999  | Snyder et al.   | 340/825.69 |
| 6,091,330 | A |   | 7/2000  | Swan et al.     |   |
| 6,756,886 | B2 |  | 6/2004  | Flick           |   |
| 6,853,895 | B2 |  | 2/2005  | Javaherian      |   |
| 2004/0144351 | A1 | * | 7/2004 | Janisch      | 123/179.2 |
| 2004/0168663 | A1 |   | 9/2004 | Matsuura et al. |   |
| 2004/0262068 | A1 |   | 12/2004 | Matsubara et al. |   |

FOREIGN PATENT DOCUMENTS

| JP | U-02-119514  |   | 9/1990 |
|----|--------------|---|--------|
| JP | A-05-218669  |   | 8/1993 |
| JP | U-06-060067  |   | 8/1994 |
| JP | A-09-100766  |   | 4/1997 |
| JP | A-10-205421  |   | 8/1998 |
| JP | U-3057814    |   | 3/1999 |
| JP | 11-208246    | * | 8/1999 |
| JP | 2000-97138   | * | 4/2000 |
| JP | A-2003-042046 |   | 2/2003 |

* cited by examiner

*Primary Examiner*—Michael J. Zanelli
(74) *Attorney, Agent, or Firm*—Oliff & Berridge, PLC

(57) ABSTRACT

A vehicle controller controls an operation of an engine of a vehicle when the engine is started with a remote command. The vehicle controller decreases the number of idle revolutions of the engine, supplies diluted fuel to the engine, uses only a few cylinders of the engine, changes parameters used in detecting and preventing knocking of the engine, controls the windows or curtains of the windows of the engine to increase the efficiency of air conditioning, and supplies lesser power to in-vehicle devices.

35 Claims, 12 Drawing Sheets

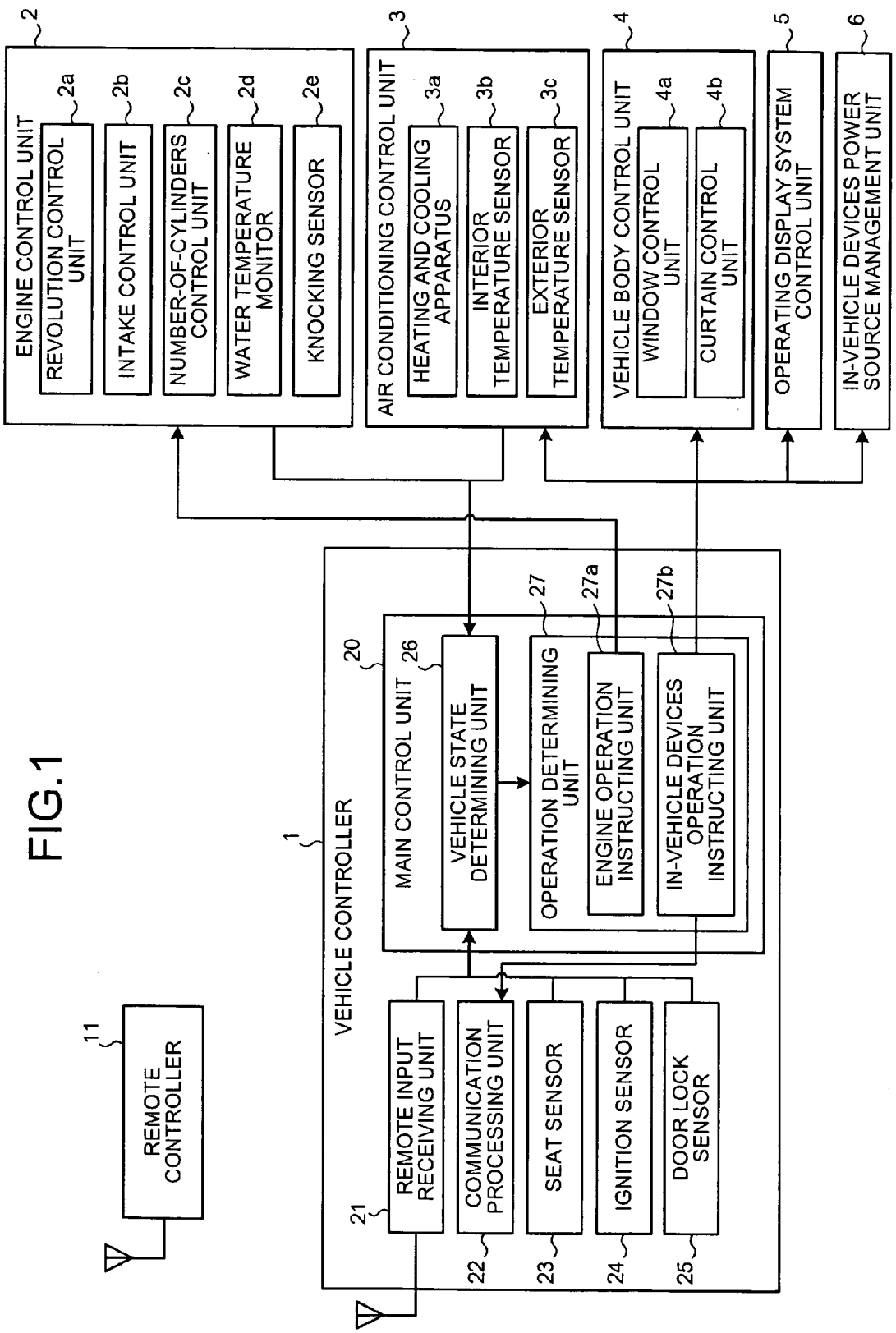

FIG.2

| | NUMBER OF IDLE REVOLUTIONS | INTAKE CONTROL / TRAVELING CONTROL | NUMBER OF IGNITION CYLINDERS | IGNITION TIMING | IDLE-UP | | | KNOCK CONTROL | | CURTAIN CONTROL | WINDOW CONTROL | POWER SOURCE OF OTHER IN-VEHICLE EQUIPMENT |
|---|---|---|---|---|---|---|---|---|---|---|---|---|
| | | | | | AIR CONDITIONING | AT START | AT LOW TEMPERATURE | THRESHOLD | QUANTITY OF CORRECTIONS | | | |
| RIDING CONTROL | NORMAL | TRAVELING CONTROL | NORMAL | NORMAL | PERFORMED | PERFORMED | PERFORMED | NORMAL | NORMAL | NOT EXECUTED | NOT EXECUTED | ON |
| WAITING CONTROL | DECREASE | LEAN BURN | REDUCTION | RETARDED | UNNECESSARY | UNNECESSARY | UNNECESSARY | RISE | DECREASE | EXECUTED | EXECUTED | OFF |

FIG.9

| | THROTTLE | LEAN-BURN CONTROL | EXHAUST-GAS RECIRCULATING CONTROL | VARIABLE VALVE TIMING CONTROL | IGNITION TIMING CONTROL | PURGE | LEARNING PROCESS |
|---|---|---|---|---|---|---|---|
| RIDING CONTROL | CLOSED (NOT CONTROLLED) | NORMAL | NORMAL | NORMAL | NORMAL | AFTER FUEL LEARNING | PERFORMED |
| WAITING CONTROL | OPENED (CONTROLLED) | ENGINE-REVOLUTIONS-DEPENDENT CONTROL | ENGINE-REVOLUTIONS-DEPENDENT CONTROL | ENGINE-REVOLUTIONS-DEPENDENT CONTROL | ADVANCED | INDEPENDENTLY | STOPPED |

|  | STRATIFICATION COMBUSTION MODE | RICH SPIKE CONTROL |
|---|---|---|
| RIDING CONTROL | NORMAL | NORMAL |
| WAITING CONTROL | CHANGE OF CONDITION FOR ENTERING COMBUSTION MODE | ENLARGEMENT OF EXECUTION AREA |

VEHICLE CONTROLLER AND VEHICLE CONTROL METHOD

BACKGROUND OF THE INVENTION

1) Field of the Invention

This invention relates to a vehicle controller that controls operations of a vehicle.

2) Description of the Related Art

When the power mechanism (generally, an engine) of a vehicle is to be activated, a driver performs a starting operation with an ignition key or the like while sitting in the vehicle. In recent years, however, a remote starting system has been developed that allows the driver to remotely activate the power mechanism. In such a remote starting system, the driver remotely activates the power mechanism with a remote-controller, such as a remote key, via a network, such as the Internet.

The remote starting system has an advantage that it becomes possible to pre-condition the compartment of the vehicle to a comfortable temperature before the driver enters the vehicle.

However, various problems occur if the power mechanism is activated continuously for a longer time to pre-condition the compartment of the vehicle. For example, there is wastage of fuel, moreover, the burning of the fuel produces toxic exhaust gases that are harmful to the environment.

As a countermeasure, in the remote starting system disclosed in Japanese Published Unexamined Patent Application No. 2003-42046, when to start the engine is determined from preset conditions, such as time when the driver enters the vehicle. On the other hand, Japanese Registered Utility Model No. 3057814 discloses a technique in which the engine is stopped when the temperature in compartment of the vehicle reaches a predetermined temperature.

Thus, the conventional techniques control the engine irrespective of whether the driver is in the vehicle. In other words, although the engine is activated with the intension of only controlling the temperature in the compartment of the vehicle, the engine performs other controls although the driver is not in the vehicle. Such other controls include knocking control to suppress the knocking of the engine.

SUMMARY OF THE INVENTION

It is an object of the present invention to at least solve the problems in the conventional technology.

According to an aspect of the present invention, a vehicle controller that controls operations of a vehicle includes a remote command receiving unit that receives a remote command related to starting a power mechanism of the vehicle; and a remote starting control unit that starts and operates the power mechanism under a waiting control, which is different from a riding control, upon the remote command receiving unit receiving the remote command.

Moreover, the remote starting control unit operates the power mechanism under a waiting control, which is different from a riding control, upon the remote command receiving unit receiving the remote command. The waiting control includes, for example, running the engine at number of revolutions that is lower than that in the riding control.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a block diagram of a vehicle controller system that includes a vehicle controller according to an embodiment of the present invention;

FIG. 2 is a schematic for explaining the difference between a riding control and a waiting control;

FIG. 9 is a table of exemplary parameters usable in the waiting control;

DETAILED DESCRIPTION

Figure 3:
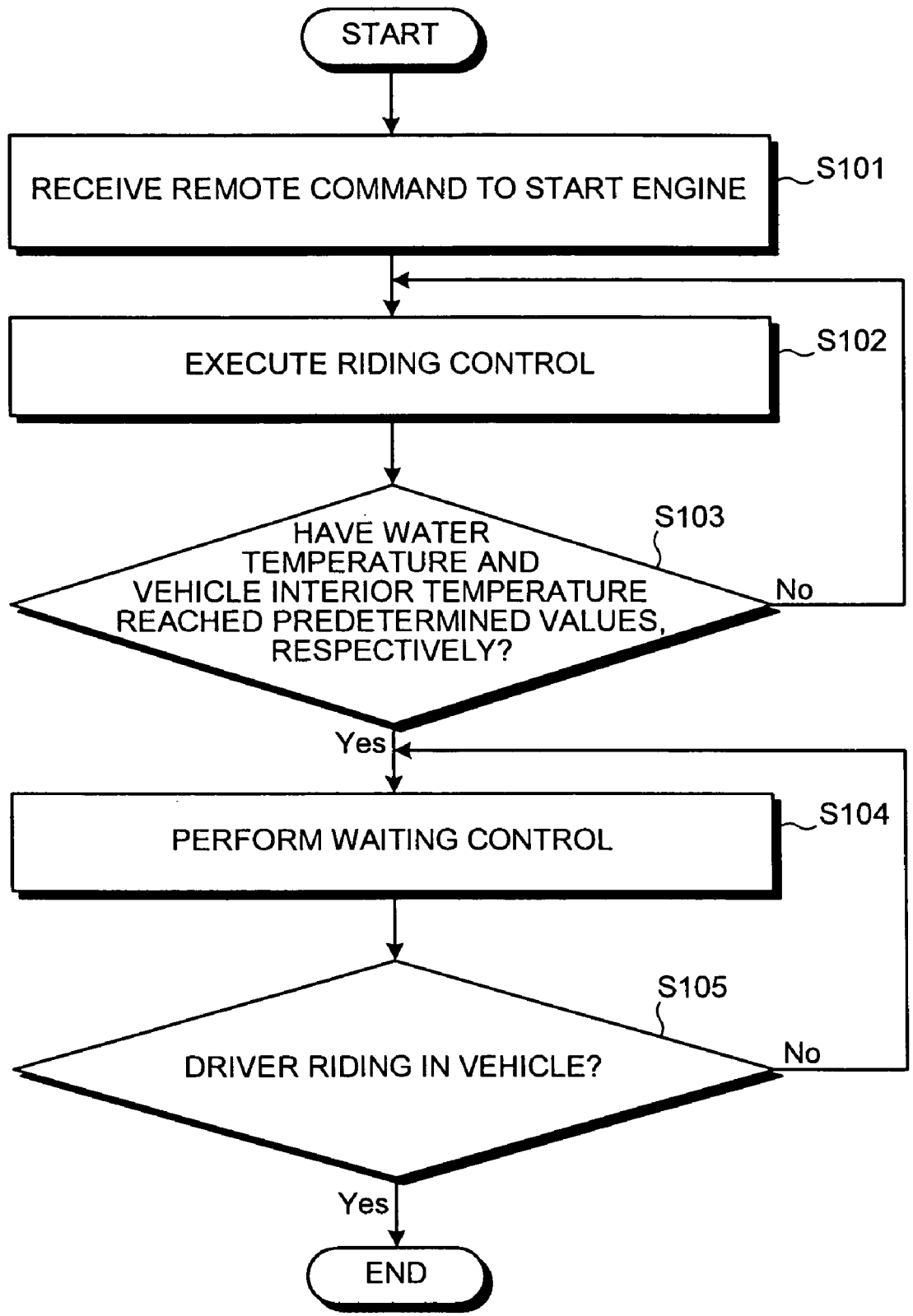
FIG. 3 is a flowchart for explaining the riding control.

Exemplary embodiments of a vehicle controller according to the present invention will be hereinafter explained in detail with reference to the accompanying drawings.

FIG. 1 is a block diagram of a vehicle controller system that includes a vehicle controller 1 according to an embodiment of the present invention. In this vehicle controller system, the vehicle controller 1 performs remote communicates with a remote-controller 11. The vehicle controller 1 is connected to an engine control unit 2, an air-conditioning control unit 3, a vehicle body control unit 4, an operating display system control unit 5, and an in-vehicle equipment power source management unit 6.

The engine control unit 2 controls the operation of an engine (not shown), and includes a revolution control unit 2a that controls engine revolutions, an intake control unit 2b that controls the mixing ratio of fuel and air supplied to the engine, a number-of-cylinders control unit 2c that controls the number of operating cylinders, a water temperature monitor 2d that monitors the temperature of cooling water, and a knocking sensor 2e that detects knocking.

The air-conditioning control unit 3 air-conditions inside the vehicle compartment, and includes a heating and cooling apparatus 3a that heats and cools the vehicle compartment, an interior temperature sensor 3b that monitors a temperature in the vehicle compartment, and an exterior temperature sensor 3c that monitors the temperature outside the vehicle compartment.

The vehicle body control unit 4 controls the operation of various devices provided in the vehicle body, and includes a window control unit 4a that controls the opening and closing of vehicle windows and sunroof and the like and a curtain control unit 4b that controls the operation of electrically-drawn curtains.

The operating display system control unit 5 controls the lighting of a display system, such as a speed meter, that is used when the vehicle is traveling. The in-vehicle equipment power source management unit 6 is a control unit that manages a power supply to various devices mounted in the vehicle, such as a navigation unit (not shown) and an audio unit (not shown).

The vehicle controller 1 includes a main control unit 20, a remote input receiving unit 21, a communication processing unit 22, a seat sensor 23, an ignition sensor 24, and a door lock sensor 25.

The remote input receiving unit 21 is a processing unit that receives remote-controlled inputs such as a door locking or unlocking command and an engine starting command. The remote input receiving unit 21 outputs such received inputs to the main control unit 20. These remote-controlled inputs are output from the remote-controller 11. The remote-controller 11 can be integrated with an ignition key that a user operates to start the vehicle from a remote place.

The communication processing unit 22 is configured to perform wireless communications with a network, such as the Internet or a telephone line, and receive vehicle operating instructions, such as an engine starting command, and send information regarding the state of the vehicle to a predetermined destination.

The seat sensor 23 is a processing unit disposed in a seat of the vehicle, and detects whether a passenger is sitting in the seat and then outputs a detection result to the main control unit 20. The ignition sensor 24 detects an ignition key is inserted and outputs a detection result to the main control unit 20. The door lock sensor 25 detects whether the door is locked or unlocked.

The main control unit 20 controls the vehicle controller 1, and includes a vehicle state determining unit 26 and an operation determining unit 27. The vehicle state determining unit 26 determines the state of the vehicle based on information obtained from the remote input receiving unit 21, the communication processing unit 22, the seat sensor 23, the ignition sensor 24, the door lock sensor 25, the engine control unit 2, and the air-conditioning control unit 3.

In more detail, the vehicle state determining unit 26 determines whether a command to start the engine is received from the output of the remote input receiving unit 21 or the output of the communication processing unit 22, determines whether a passenger is sitting in the seat or somebody is standing near the vehicle from the output of the seat sensor 23, the output of the ignition sensor 24, or the output of the door lock sensor 25, determines a state of the operation of the engine, the water temperature of the cooling water, and the occurrence or non-occurrence of knocking from the output of the engine control unit 2, and determines the exterior temperature and the vehicle interior temperature from the air-conditioning control unit 3.

The operation determining unit 27 determines the details of operations of the engine and the in-vehicle devices based on determination results obtained by the vehicle state determining unit 26. The operation determining unit 27 includes an engine operation instructing unit 27a and an in-vehicle devices operation instructing unit 27b. The engine operation instructing unit 27a determines an operation of the engine control unit 2 and sends operational instructions thereto. The in-vehicle equipment operation instructing unit 27b determines operations of the air-conditioning control unit 3, the vehicle body control unit 4, the operating display system control unit 5, and the in-vehicle equipment power source management unit 6, and sends operational instructions thereto.

Normally, the operating conditions of the engine are set on the assumption that a passenger is in the vehicle. In more detail, the operating conditions are set such that the engine runs at a revolving speed and at the quantity of gasoline injection where an engine stall does not occur even when an accelerator is operated.

The engine becomes unstable particularly from the start of the engine until the temperature of the cooling water reaches to particular level and the engine warms to a particular level. Therefore, when starting the engine, it is common to perform an idle-up operation in which the engine is run at higher revolutions in starting the engine than after the completion of air warming.

Additionally, as is well known, a low temperature idle-up operation in which the engine runs at an even greater number of revolutions is performed when the exterior temperature is low, or a revolving-speed increasing operation is performed when in-vehicle devices, such as an air conditioner, is operated, so as to store electric power used by the in-vehicle devices in a battery.

Thus, in the vehicle control performed at the present time, a margin is given to the operation of the engine so that the vehicle can travel safely and comfortably even when air warming is not sufficiently performed, e.g., even when the vehicle starts traveling immediately after the start of the engine.

However, since the driver is remote from the vehicle when an engine starting command is received by remote control, a non-traveling state in which the vehicle does not travel continues until the driver rides in the vehicle. Therefore, if vehicle control is performed on the assumption that persons ride therein as described above and that the vehicle may travel in spite of the fact that no person rides in the vehicle and, evidently, the vehicle does not travel, the engine runs at an excessive output. As a result, unnecessary fuel is consumed, and an exhaust gas is emitted.

Therefore, when a command to start the engine is received by remote control, the operation determining unit 27 executes remote starting control, which differs from, for example, the engine starting control by which a command to start the engine is given with the ignition key on the assumption that a person rides in the vehicle and that the vehicle may travel.

Referring now to FIG. 2, the remote starting control will be described in detail. FIG. 2 is an explanatory drawing for explaining a comparison between riding control which is executed in a state in which persons ride in the vehicle and hence the vehicle may travel and vehicle-ride waiting control (hereinafter, referred to simply as "waiting control") which is executed in a state in which no person rides in the vehicle.

As shown in FIG. 2, in the waiting control, the number of idle revolutions of the engine is made smaller than in the riding control. The number of idle revolutions of the engine is set smaller than when the vehicle is traveling (i.e., when idling is not performed) and high enough to prevent an engine stall caused by a load change brought about when a vehicle occupant performs some operations.

Since the waiting control is executed on the assumption that a person is not in the vehicle, the number of revolutions can be set smaller than this number of idle revolutions.

Further, in the waiting control, the concentration of fuel to be supplied is made lower than in the riding control (lean-burn control). Further, in the waiting control, the number of cylinders to be ignited is made lower than in the riding control. Further, in the waiting control, an ignition timing is controlled to lag than in the riding control.

In the riding control, the number of idle revolutions is raised (idle-up) when the vehicle compartment is air-conditioned, when the engine is started, and when the exterior temperature is low. However, in the waiting control, there is no need to raise the number of idle revolutions in such cases.

Further, in the waiting control, a threshold to detect knocking is made higher than in the riding control so as to decrease detection sensitivity and so as to reduce the quantity of correction to control the engine when knocking-preventing control is performed to prevent knocking caused when abnormal combustion occurs or caused when an ignition timing is inappropriate.

In the riding control, the electrically-drawn curtain and the window are not controlled to be opened or closed, but, in the waiting control, the operation of the electrically-drawn curtain and the operation of the window are controlled. Concerning the curtain control, an air-conditioning effect can be heightened, for example, by closing the curtain during air conditioning. Additionally, when the vehicle interior temperature is higher than the exterior temperature, for example, in summer, the vehicle interior temperature can be effectively lowered by opening the window. The window is not limited to the one formed in the door. For example, a sunroof can be controlled in the same way.

In the riding control, the display system, such as a speed meter, used when the vehicle is traveling is lit, and electric power is supplied also to the in-vehicle devices, such as a navigation unit and an audio unit. Lighting and operation of the units are required when the vehicle is traveling, but these are not required when the driver does not ride in the vehicle. Therefore, in the waiting control, the supply of electric power to these units is stopped to reduce power consumption, and an engine output required for power supply (battery charging) is reduced.

The lean-burn control by which fuel to be supplied is diluted and the control to decrease the number of ignition cylinders have already been realized as techniques used when the vehicle is traveling at a predetermined speed. Therefore, the engine control unit 2 having the same structure as the conventional one can be allowed to execute the waiting control by employing these techniques. Since the conventional lean-burn control and the conventional ignition-cylinders decreasing control are executed on the assumption that persons ride in the vehicle, these controls are executed so that as little unpleasantness as possible is given to the vehicle occupants. However, according to the present invention, these controls are executed on the assumption that no person rides in the vehicle. Therefore, fuel is made even thinner, and the number of ignition cylinders can be made even smaller than in the conventional lean-burn control.

When the waiting control is executed, all control steps shown in FIG. 2 do not necessarily need to be performed. Some of the control steps shown therein may be performed, and the remaining steps may be performed in the same way as in the riding control. For example, the number of idle revolutions in the waiting control may be made smaller than in the riding control, and the other control steps may be performed in the same way as in the riding control.

In the remote starting control, the fuel consumption of the vehicle is reduced by a combination of the riding control and the waiting control. As examples of the fuel consumption reducing method, the following methods can be mentioned: "a method in which the engine is started according to the riding control when a remote command to start the engine is received, and switching to the waiting control is performed after the completion of air warming or air conditioning," "a method in which the engine is started according to the waiting control when a remote command to start the engine is received," and "a method in which the engine is started according to the waiting control when a remote command to start the engine is received, and the engine is stopped after the completion of air warming or air conditioning."

First, a description will be given of "a method in which the engine is started according to the riding control when a remote command to start the engine is received, and switching to the waiting control is performed after the completion of air warming or air conditioning." FIG. 3 is a flowchart for explaining the remote starting control executed when this method is employed. This processing flow is started when the remote input receiving unit 21 or the communication processing unit 22 receives a remote command to start the engine.

First, the remote input receiving unit 21 or the communication processing unit 22 receives a remote command to start the engine, and the vehicle state determining unit 26 determines that the engine is started while the driver is not in the vehicle (step S101).

Thereafter, the operation determining unit 27 starts the engine, and executes the riding control (step S102). Thereafter, the vehicle state determining unit 26 monitors an output of the water temperature monitor 2*d* and an output of the interior temperature sensor 3*b*, and determines whether the water temperature of the cooling water and the vehicle interior temperature have reached predetermined values, respectively (step S103).

As a result, if either the water temperature or the vehicle interior temperature has not reached the predetermined value (step S103, No), the operation determining unit 27 continues executing the riding control (step S102). On the other hand, if both the water temperature and the vehicle interior temperature have reached the predetermined values, respectively (step S103, Yes), the operation determining unit 27 performs switching to the waiting control (step S104).

Thereafter, the vehicle state determining unit 26 monitors driver's approach to or riding in the vehicle from an output of the seat sensor 23, an output of the ignition sensor 24, and an output of the door lock sensor 25 (step S105).

As a result, if the driver has not approached the vehicle or has not been riding therein (step S105, No), the operation determining unit 27 continues executing the waiting control (step S104), and, if the driver has approached the vehicle or has been riding therein (step S105, Yes), the operation determining unit 27 ends the remote starting control. Preferably, the process proceeds to the normal control (i.e., the riding control) after the end of the remote starting control.

Thus, the riding control is used until the cooling-water temperature and the vehicle interior temperature reach the predetermined values, respectively, and, after that, switching to the waiting control is performed. Therefore, the air warming or air conditioning can be finished early, and the fuel consumption can be restricted.

Figure 4:
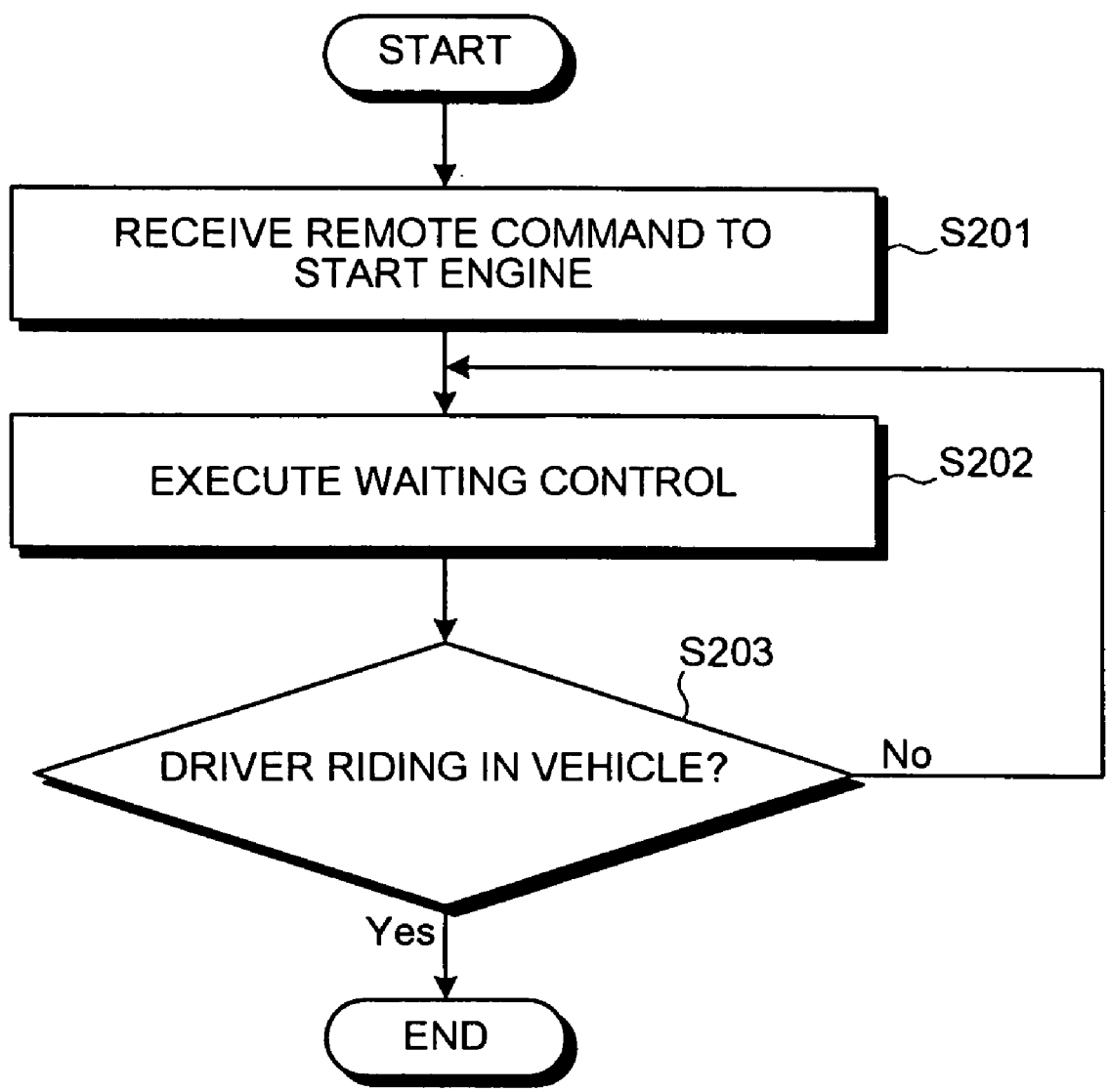
FIG. 4 is a flowchart for explaining the waiting control.

Next, a method is explained in which the engine is started according to the waiting control when a remote command to start the engine is received. FIG. 4 is a flowchart for explaining the remote starting control executed in this method. This processing flow is started when the remote input receiving unit 21 or the communication processing unit 22 receives a remote command to start the engine.

First, the remote input receiving unit 21 or the communication processing unit 22 receives a remote command to start the engine, and the vehicle state determining unit 26 determines that the engine is started when the driver is absent (step S201).

Thereafter, the operation determining unit 27 starts the engine, and executes the waiting control (step S202). The vehicle state determining unit 26 monitors the driver's approach to or riding in the vehicle from an output of the seat sensor 23, an output of the ignition sensor 24, and an output of the door lock sensor 25 (step S203).

As a result, if the driver has not approached the vehicle or has not been riding therein (step S203, No), the operation determining unit 27 continues executing the waiting control (step S202), and, if the driver has approached the vehicle or has been riding therein (step S203, Yes), the operation determining unit 27 ends the remote starting control. Preferably, the process proceeds to the normal control (i.e., the riding control) after the end of the remote starting control. Thus, burnout fuel can be made even smaller by using the waiting control from the time when the remote command to start the engine is received.

Figure 5:
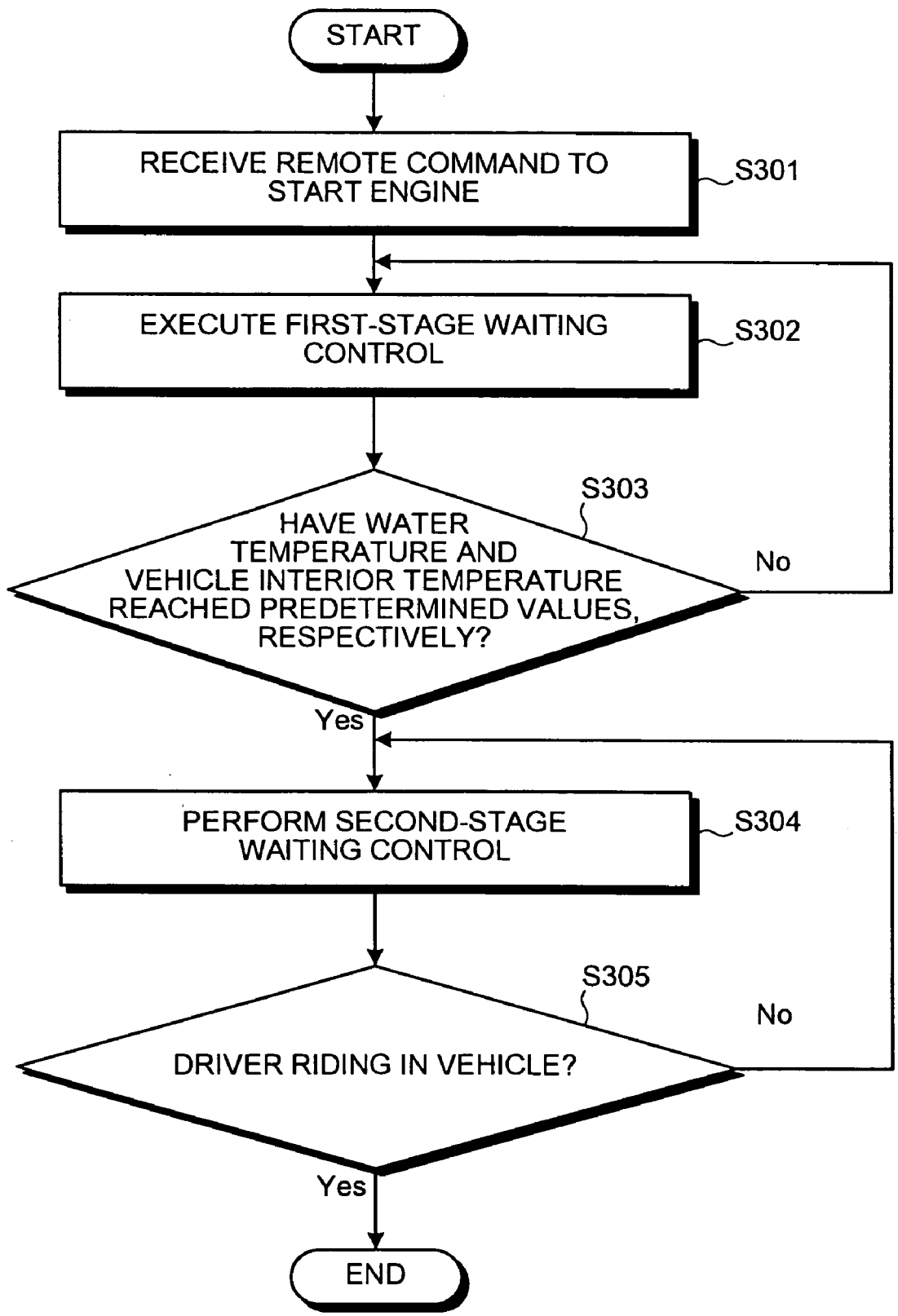
FIG. 5 is a flowchart for explaining another way of performing the remote starting control.

The waiting control is not necessarily limited to the single one, and it is permissible to combine together a plurality of waiting controls that have different stages. FIG. 5 is a flowchart for explaining the remote starting control executed when two-stage waiting control is employed. This processing flow is started when the remote input receiving unit 21 or the communication processing unit 22 receives a remote command to start the engine.

First, the remote input receiving unit 21 or the communication processing unit 22 receives a remote command to start the engine, and the vehicle state determining unit 26 determines that the engine is started when the driver is absent (step S301).

Thereafter, the operation determining unit 27 starts the engine, and executes first-stage waiting control (step S302). Thereafter, the vehicle state determining unit 26 monitors an output of the water temperature monitor 2*d* and an output of the interior temperature sensor 3*b*, and determines whether the cooling-water temperature and the vehicle interior temperature have reached predetermined values, respectively (step S303).

As a result, if either the water temperature or the vehicle interior temperature has not reached the predetermined value (step S303, No), the operation determining unit 27 continues executing the first-stage waiting control (step S302). On the other hand, if both the water temperature and the vehicle interior temperature have reached the predetermined values, respectively (step S303, Yes), the operation determining unit 27 performs switching to second-stage waiting control (step S304).

The vehicle state determining unit 26 monitors the driver's approach to or riding in the vehicle from an output of the seat sensor 23, an output of the ignition sensor 24, and an output of the door lock sensor 25 (step S305).

As a result, if the driver has not approached the vehicle or has not been riding therein (step S305, No), the operation determining unit 27 continues executing the waiting control (step S304), and, if the driver has approached the vehicle or has been riding therein (step S305, Yes), the operation determining unit 27 ends the remote starting control. Preferably, the process proceeds to the normal control (i.e., the riding control) after the end of the remote starting control.

Air warming or air conditioning can be finished early, and fuel consumption can be restricted to a lower level by performing switching between a plurality of waiting controls in this way.

The first-stage waiting control and the second-stage waiting control may differ from each other in a combination of its operational contents or in the control contents of the same item.

For example, a reduction in the number of idle revolutions can be performed as the first-stage waiting control, and a reduction in the number of ignition cylinders and lean-burn control can be performed as the second-stage waiting control. Alternatively, the lean-burn control can be employed as both the first-stage waiting control and the second-stage waiting control so that the concentration of fuel in the lean-burn control of the second-stage waiting control becomes thinner than that of fuel in the lean-burn control of the first-stage waiting control.

The waiting control does not necessarily need to include the engine control. Automatic control of curtains, automatic control of windows, and power supply control of other in-vehicle devices can be executed, and the same control steps as in the riding control may be used for items concerning the engine control.

Next, switching conditions of the operation control will be described. In the flowcharts shown in FIG. 3 and FIG. 5, a condition for performing switching between operations is established by the fact that the water temperature of the cooling water and the vehicle interior temperature have reached the predetermined values, respectively. However, an arbitrary condition can be used as this operation switching condition.

Figure 6:
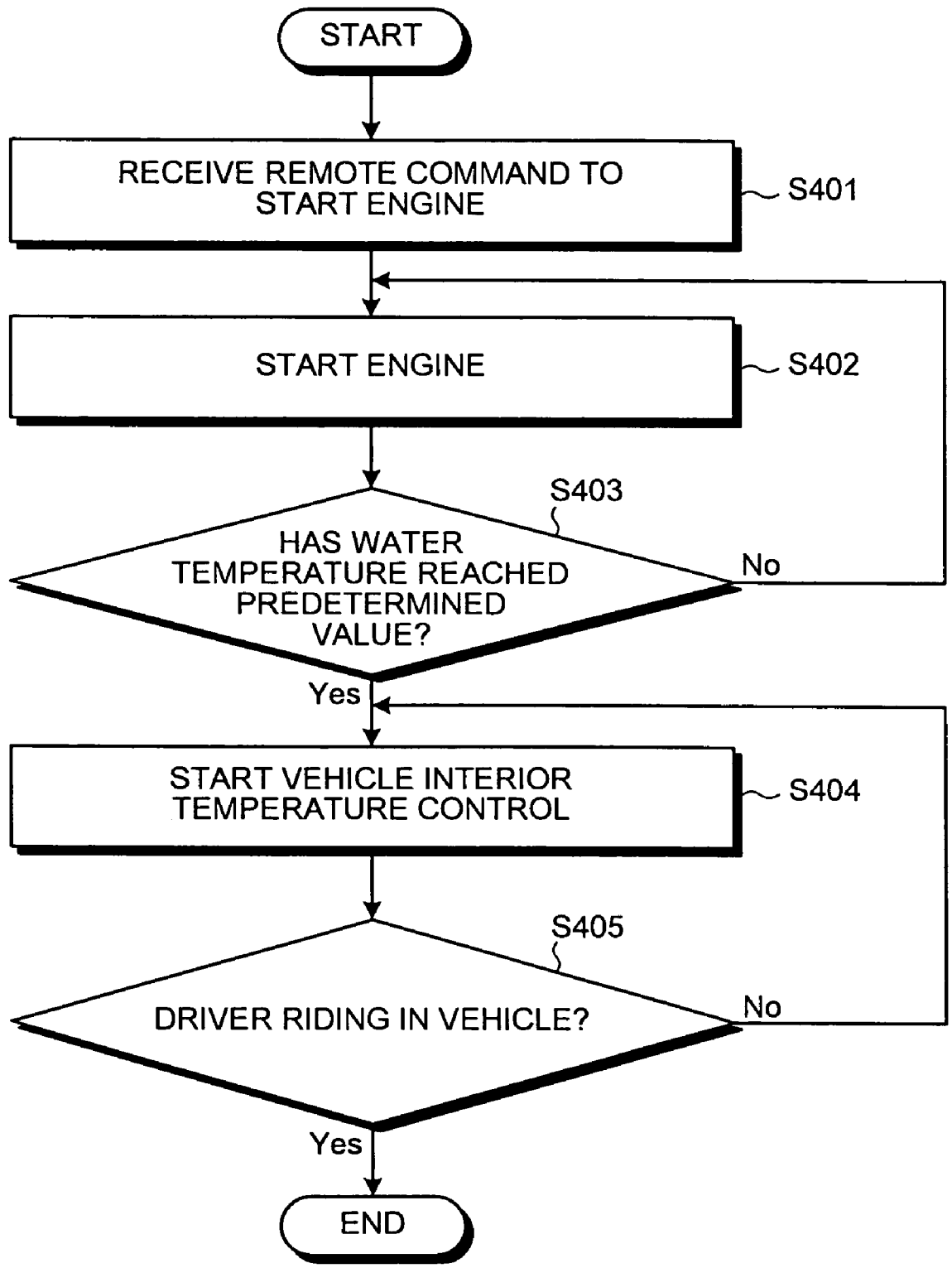
FIG. 6 is a flowchart for explaining still another way of performing the remote starting control.

For example, air warming by the engine may be first performed while monitoring the temperature of the cooling water, and air conditioning may be started after the water temperature reaches a predetermined value, and the air warming is finished. FIG. 6 is a flowchart for explaining the remote starting control performed when this control is executed. This processing flow is started when the remote input receiving unit 21 or the communication processing unit 22 receives a remote command to start the engine.

First, the remote input receiving unit 21 or the communication processing unit 22 receives a remote command to start the engine, and the vehicle state determining unit 26 determines that the engine is started when the driver is absent (step S401).

Thereafter, the operation determining unit 27 starts the engine, and executes the riding control or the waiting control (step S402). At this time, air conditioning is not performed. Thereafter, the vehicle state determining unit 26 monitors an output of the water temperature monitor 2*d*, and determines whether the temperature of the cooling water has reached a predetermined value (step S403).

As a result, if the water temperature has not reached the predetermined value (step S403, No), the operation determining unit 27 executes step S402 again. On the other hand, if the water temperature has reached the predetermined value (step S403, Yes), the operation determining unit 27 allows the air-conditioning control unit 3 to start the vehicle interior temperature control (step S404).

The vehicle state determining unit 26 monitors the driver's approach to or riding in the vehicle from an output of the seat sensor 23, an output of the ignition sensor 24, and an output of the door lock sensor 25 (step S405).

As a result, if the driver has not approached the vehicle or has not been riding therein (step S405, No), the operation determining unit 27 continues executing the waiting control (step S404), and, if the driver has approached the vehicle or has been riding therein (step S405, Yes), the operation determining unit 27 ends the remote starting control. Preferably, the process proceeds to the normal control (i.e., the riding control) after the end of the remote starting control.

The air warming operation and the air conditioning operation can be controlled according to priority by setting the operation switching condition and the control contents in this way.

Figure 7:
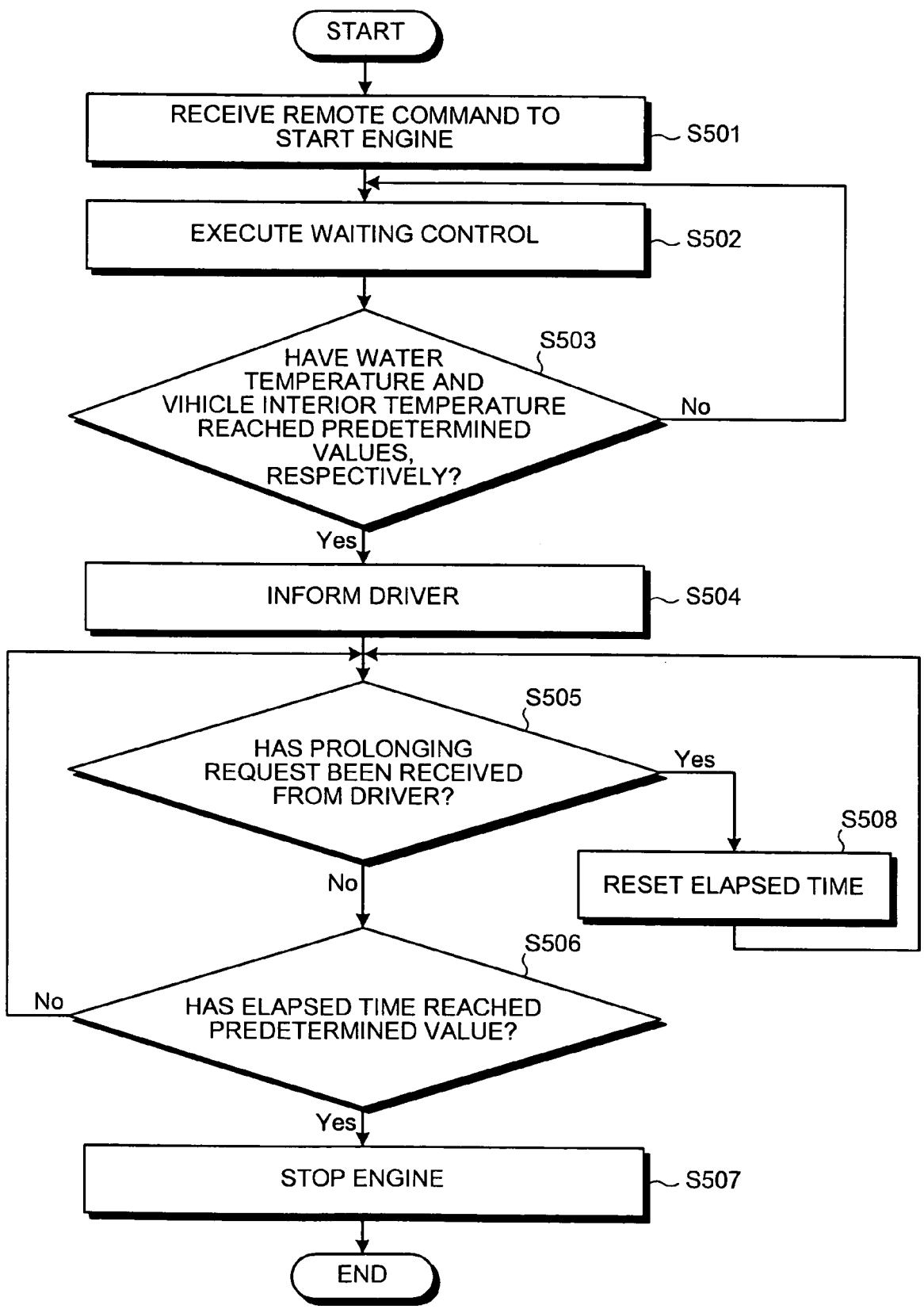
FIG. 7 is a flowchart for explaining still another way of performing the remote starting control.

Next, a description will be given of "a method in which the engine is started according to the waiting control when a remote command to start the engine is received, and the engine is stopped after the completion of air warming or air conditioning." FIG. 7 is a flowchart for explaining the remote starting control executed when this method is employed. This processing flow is started when the remote input receiving unit 21 or the communication processing unit 22 receives a remote command to start the engine.

First, the remote input receiving unit 21 or the communication processing unit 22 receives a remote command to start the engine, and the vehicle state determining unit 26 determines that the engine is started when the driver is absent (step S501).

Thereafter, the operation determining unit 27 starts the engine, and executes the waiting control (step S502). Thereafter, the vehicle state determining unit 26 monitors an output of the water temperature monitor 2d and an output of the interior temperature sensor 3b, and determines whether the cooling-water temperature and the vehicle interior temperature have reached predetermined values, respectively (step S503).

As a result, if either the water temperature or the vehicle interior temperature has not reached the predetermined value (step S503, No), the operation determining unit 27 continues executing the waiting control (step S502). On the other hand, if both the water temperature and the vehicle interior temperature have reached the predetermined values, respectively (step S503, Yes), the operation determining unit 27 informs the driver that the air warming operation and the air conditioning operation have been finished (step S504). It is preferable to use a remote key, a remote-controlled terminal, or a driver's cellular phone as a notified party at this time.

Thereafter, the vehicle state determining unit 26 monitors whether the remote input receiving unit 21 or the communication processing unit 22 has received an operation prolonging request from the driver (step S505). As a result, if the operation prolonging request has been received from the driver (step S505, Yes), the operation determining unit 27 resets the elapsed time from the notice to the driver (step S508).

On the other hand, if the operation prolonging request has not been received from the driver (step S505, No), the operation determining unit 27 determines whether the elapsed time from the notice to the driver (or from the time when resetting is performed at step S508) has reached a predetermined value (step S506).

As a result, if the elapsed time has not reached the predetermined value (step S506, No), the vehicle state determining unit 26 again monitors whether the remote input receiving unit 21 or the communication processing unit 22 has received an operation prolonging request from the driver (step S505).

On the other hand, if the elapsed time has reached the predetermined value (step S506, Yes), the operation determining unit 27 stops the engine (step S507), and ends the remote starting control.

Thus, the burnout fuel can be effectively reduced by controlling the engine to be stopped after the completion of air warming or air conditioning. Additionally, this control is effective when the driver is delayed in riding in the vehicle or the driver cancels riding in the vehicle for some reason in spite of the fact that the driver has remotely started the engine.

Additionally, convenience can be greatly improved by giving a notice to the driver when air warming or air conditioning is completed so as to stop the engine after a predetermined time elapses from the issuance of the notice and by extending the time consumed until the engine is stopped when the driver sends a prolonging request.

In the flowchart shown in FIG. 7, the time consumed until the engine is stopped is extended by resetting the elapsed time from the issuance of the notice when a prolonging request is received from the driver. However, the time consumed from the issuance of the notice to the stop of the engine and the extended time determined when the prolonging request is received may be set individually, or instructions about duration to be extended may be received from the driver.

The timing at which a notice is given to the driver is not limited to the moment when air warming or air conditioning is finished. For example, it is permissible to give the notice when a predetermined time elapses from the end of the air warming operation or the air conditioning operation, or it is permissible to predict the time of the end of the air warming operation or the air conditioning operation and give the notice a predetermined time before the predicted end time.

Figure 8:
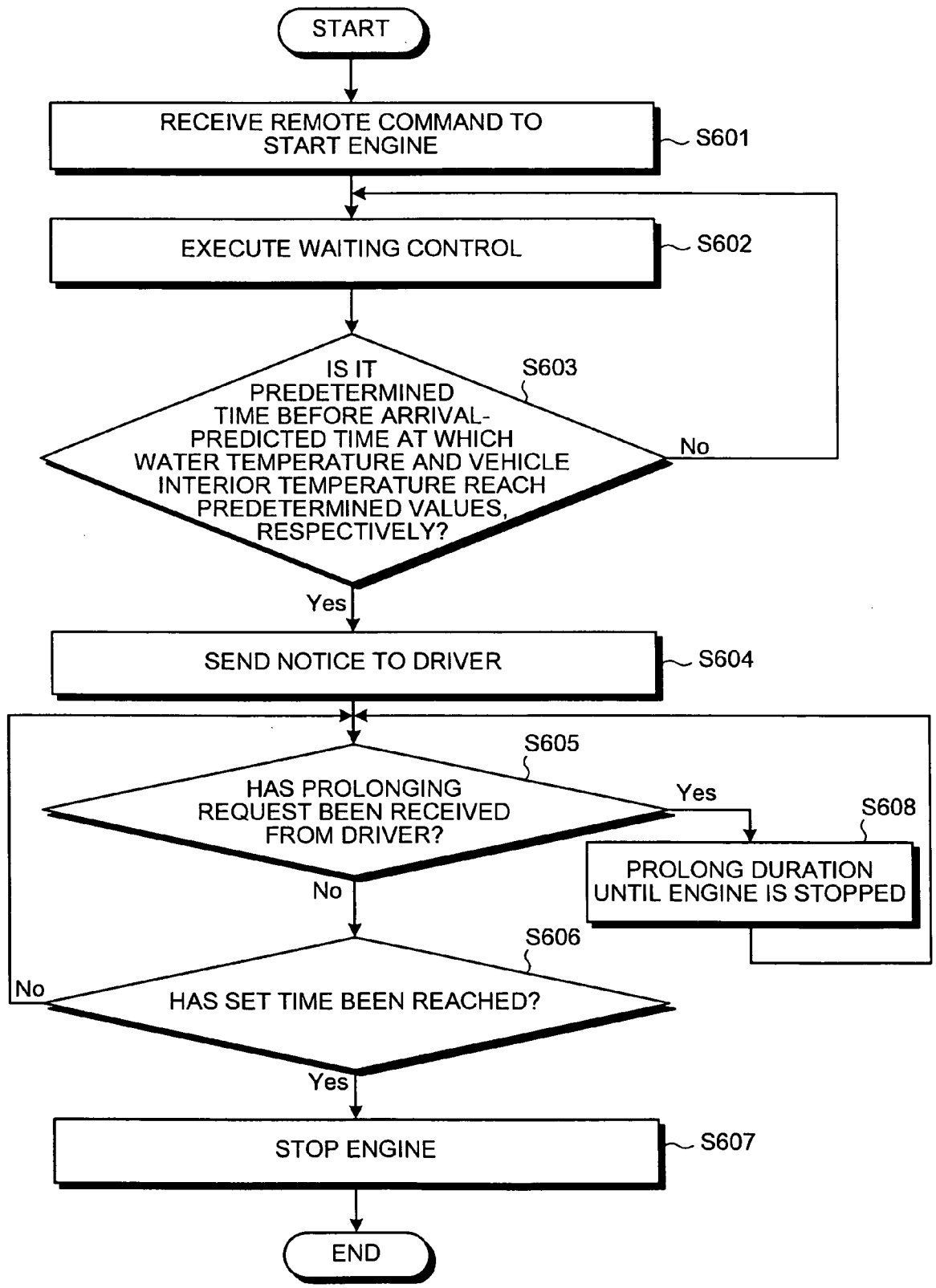
FIG. 8 is a flowchart for explaining still another way of performing the remote starting control.

FIG. 8 is a flowchart for explaining the remote starting control executed when a notice is given a predetermined time before the predicted end time. This processing flow is started when the remote input receiving unit 21 or the communication processing unit 22 receives a remote command to start the engine.

First, the remote input receiving unit 21 or the communication processing unit 22 receives a remote command to start the engine, and the vehicle state determining unit 26 determines that the engine is started when the driver is absent (step S601).

Thereafter, the operation determining unit 27 starts the engine, and executes the waiting control (step S602). Thereafter, the vehicle state determining unit 26 calculates the arrival-predicted time at which the cooling-water temperature and the vehicle interior temperature reach predetermined values, respectively, from an output of the water temperature monitor 2d and an output of the interior temperature sensor 3b, and determines whether it is a predetermined time before the arrival-predicted time (step S603).

As a result, if it is not the predetermined time before the arrival-predicted time (step S603, No), the operation determining unit 27 continues executing the waiting control (step S602). On the other hand, if it is the predetermined time before the arrival-predicted time (step S603, Yes), the operation determining unit 27 sends a notice to the driver (step S604).

Thereafter, the vehicle state determining unit 26 monitors whether the remote input receiving unit 21 or the communication processing unit 22 has received an operation prolonging request from the driver (step S605). As a result, if the operation prolonging request has been received from the driver (step S605, Yes), the operation determining unit 27 prolongs a duration until the engine is stopped (step S608).

On the other hand, if the operation prolonging request has not been received from the driver (step S605, No), the operation determining unit 27 determines whether a set time (which is the arrival-predicted time if the prolonging request has never been received from the driver, or which is the time that is set by the extension at the last step S608 if the prolonging request has been received from the driver) has been reached (step S606).

As a result, if the set time has not been reached (step S606, No), the vehicle state determining unit 26 again monitors whether the remote input receiving unit 21 or the communication processing unit 22 has received an operation prolonging request from the driver (step S605).

On the other hand, if the set time has been reached (step S606, Yes), the operation determining unit 27 stops the engine (step S607), and ends the remote starting control.

Thus, the timing at which a notice is sent to the driver or the timing at which the engine is stopped can be arbitrarily set. Although the waiting control is employed at step S502 and step S602 as shown in FIG. 7 and FIG. 8, air warming or air conditioning may be performed according to the operations of the riding control.

A reduction in burnout fuel achieved by stopping the engine described with reference to FIG. 7 and FIG. 8 can be employed in combination with the steps shown in FIG. 3 to FIG. 6.

As described above, the vehicle controller 1 according to this embodiment reduces burnout fuel and exhaust gas emissions by allowing the engine and the in-vehicle devices to perform operations differing from the ordinary ones in the manner of the remote starting control when the remote input receiving unit 21 or the communication processing unit 22 receives a remote command to start the engine.

Specifically, a reduction in burnout fuel is achieved, for example, by a decrease in the number of idle revolutions by the revolution control unit 2a, dilution of supply fuel by the intake control unit 2b, a decrease in the number of cylinders by the number-of-cylinders control unit 2c, both a change in knocking detecting threshold and a decrease in correction value for the prevention of knocking by the knocking sensor 2e, an increase in air conditioning efficiency by the operation control of windows or curtains, and restriction of power consumption of the display device and the in-vehicle devices by power control.

Without being limited to this embodiment, the present invention can use various operations applicable when a power mechanism is remotely started. An applied example of the present invention will be described.

FIG. 9 is a table showing another operational example usable as the waiting control of an engine. As shown in FIG. 9, suitable operations of "throttle control," "lean-burn control," "exhaust gas recirculating control," "variable valve timing control," "ignition timing control," "purge control," and "learning process control" can be set for the waiting control.

According to the "throttle control," the throttle is opened or closed when the driver operates an accelerator pedal in the riding control. Therefore, the throttle is closed (i.e., the throttle is not controlled) when the driver does not ride in the vehicle (i.e., when the accelerator pedal is not depressed).

However, in the closed state of the throttle, an output necessary to continue the engine revolution becomes large because of friction. Therefore, the friction is decreased, and the output necessary to continue the engine revolution is decreased by opening the throttle in the manner of the waiting control. As a result, the engine can be allowed to run without causing a stall even when the fuel becomes thinner.

In the riding control, the lean-burn control by which fuel is diluted is executed independently of the number of engine revolutions. However, in the waiting control, it is preferable to lower the concentration of fuel as much as possible within the range where no stall is caused. Therefore, the fuel concentration is gradually made lower while monitoring variations in the number of engine revolutions, and a process for increasing the fuel concentration is repeatedly performed when a decrease in the fuel concentration exceeding a predetermined value is detected, thus making it possible to operate the engine at the thinnest fuel concentration without causing an engine stall.

Exhaust gas recirculating control (EGR control) is known for re-supplying an exhaust gas emitted from the engine to the engine. The exhaust gas recirculating control is effective in decreasing the combustion temperature of the engine and in reducing emissions. The exhaust gas recirculating control can also be used as the waiting control. Likewise, in this case, an exhaust gas to be supplied to the engine is gradually increased while monitoring variations in the number of engine revolutions, and a process for decreasing an exhaust gas to be supplied to the engine is repeatedly performed when a fall exceeding a predetermined value is detected, thus making it possible to increase the quantity of exhaust gas to be supplied to the engine as much as possible so as to lower the combustion temperature of the engine.

Variable valve timing control (VVT control) is also known for controlling the valve opening and closing timing of an intake valve or an exhaust valve, and is usable as the waiting control. Likewise, in this case, an overlap time during which the intake valve and the exhaust valve are simultaneously opened is gradually increased while monitoring variations in the number of engine revolutions. If a fall exceeding a predetermined value is detected, a process for decreasing the overlap time is repeatedly performed.

According to ignition timing control, torque is gradually raised by advancing the timing in the manner of the waiting control, thus making it possible to operate the engine without causing a stall even when thinner fuel is used.

In the riding control, purge (i.e., fuel stored in a canister after vaporization) is used after fuel learning. On the other hand, in the waiting control, a reduction in fuel consumption takes priority to a stable operation of the engine, and hence a learning process, such as fuel learning, cannot be normally performed. Therefore, in the waiting control, the use of purge independent of fuel learning makes it possible to establish compatibility between a reduction in fuel consumption and the use of purge. It is preferable to stop various learning processes concerning the operation of the engine, such as fuel learning or learning in the idle speed control (ISC).

Figures 10, 11:
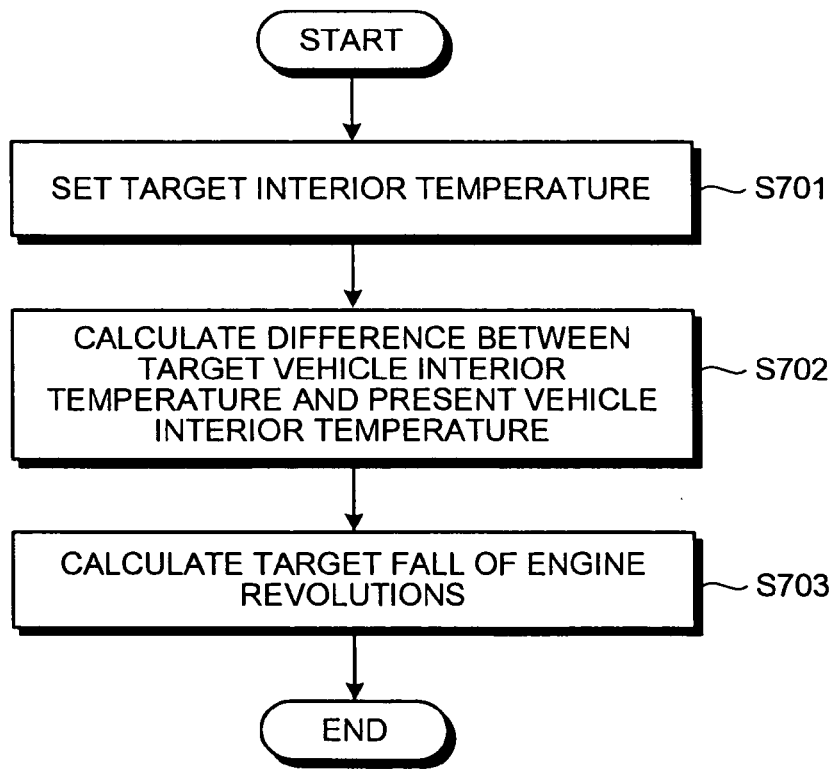
FIG. 10 is a table of exemplary parameters usable in the waiting control in case of a direct fuel-injection engine.
FIG. 11 is a flowchart of a process procedure for controlling a target vehicle interior temperature and engine revolutions.

Operations characteristic of a specific engine, such as a direct fuel-injection engine, can be used in the waiting control in addition to the generally performed operations of the engine as mentioned above. An example of the waiting control in the direct fuel-injection engine is shown in FIG. 10.

In the direct fuel-injection engine, an air-fuel mixture having an easily ignitable concentration is gathered around an ignition plug, and a stratification combustion mode is used to stably ignite layers differing in concentration. This stratification combustion mode can also be used as the waiting control.

Further, a condition for entering the stratification combustion mode in executing the waiting control is set to be different from that in executing the riding control, and the execution area of stratification combustion is enlarged, thus making it possible to reduce the fuel consumption.

It is preferable to reduce emissions such that a condition for entering the rich spike control (i.e., control to improve the emission removing properties of a catalyst by temporarily raising the concentration of supply fuel) in the stratification combustion mode is changed in the same way, and the execution area of rich spike is enlarged.

Figure 12:
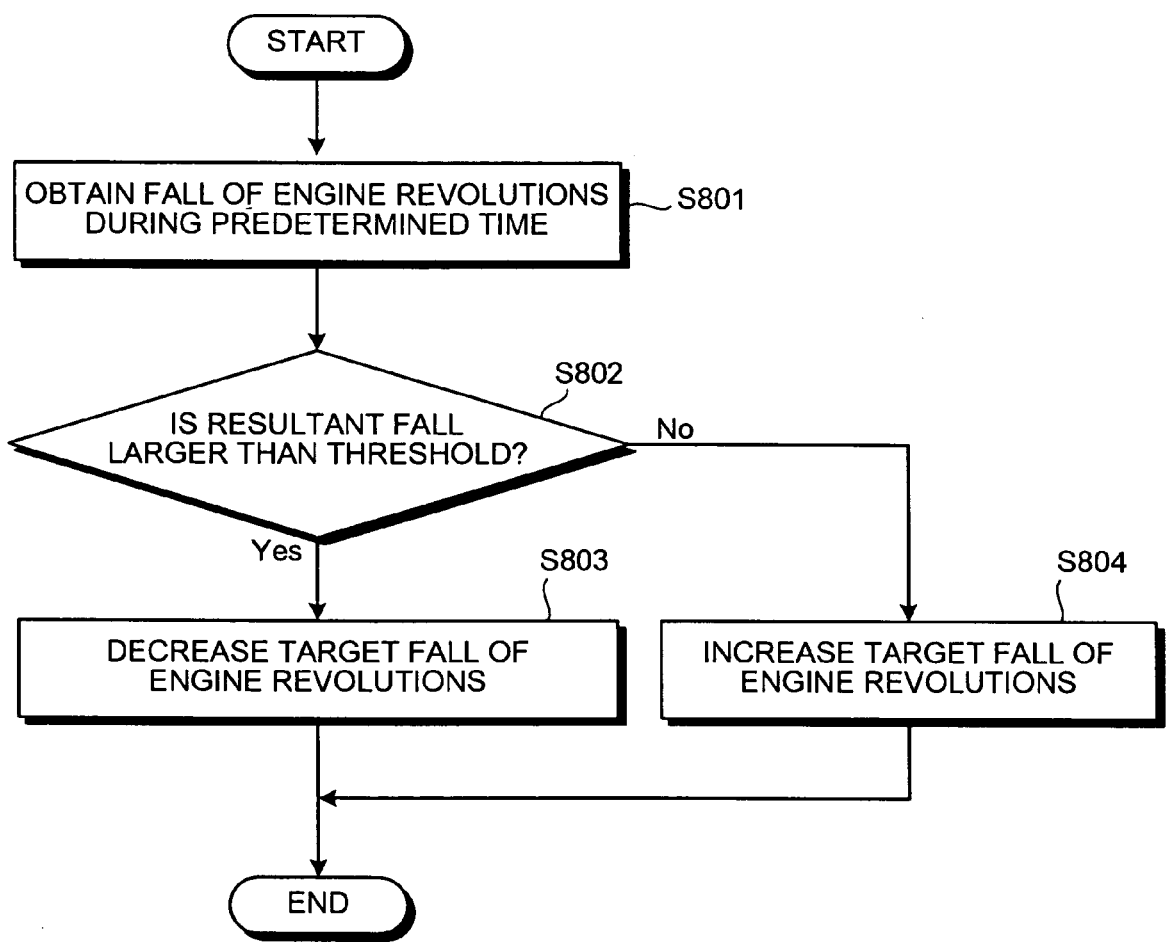
FIG. 12 is a flowchart for explaining a process procedure for controlling an engine based on a target fall of engine revolutions shown in FIG. 11.

Next, a description will be given of a modification of a combination of the riding control and the waiting control. FIG. 11 and FIG. 12 are flowcharts for explaining a process for preferentially executing the vehicle interior temperature control when a remote starting command is received.

First, a target vehicle interior temperature is set as shown in FIG. 11 when the engine is remotely started (step S701). Thereafter, a difference between the target vehicle interior temperature and the present vehicle interior temperature is calculated (step S702). Accordingly, an operation quantity of the heating and cooling apparatus 3a necessary to allow the vehicle interior temperature to reach the target vehicle interior temperature becomes clear, and a possible minimum engine speed (i.e., target fall of engine revolutions) can be calculated while maintaining the engine power necessary to perform its operation (step S703).

The fuel consumption can be reduced by controlling the number of engine revolutions based on this target fall of engine revolutions while preferentially executing the vehicle interior temperature control. FIG. 12 is a concrete example of the engine control based on the target fall of engine revolutions.

As shown in FIG. 12, a fall of engine revolutions during a predetermined time is first obtained (step S801), and a determination is made as to whether the resultant fall thereof is larger than a threshold (step S802).

As a result, if the resultant fall thereof is below the threshold, the target fall of engine revolutions is increased (step S804), and, if the resultant fall thereof is greater than the threshold, the target fall of engine revolutions is decreased (step S803).

The repeated performance of the process shown in FIG. 12 makes it possible to lessen the number of engine revolutions as much as possible while maintaining the engine power necessary to execute the vehicle interior temperature control.

Figure 13:
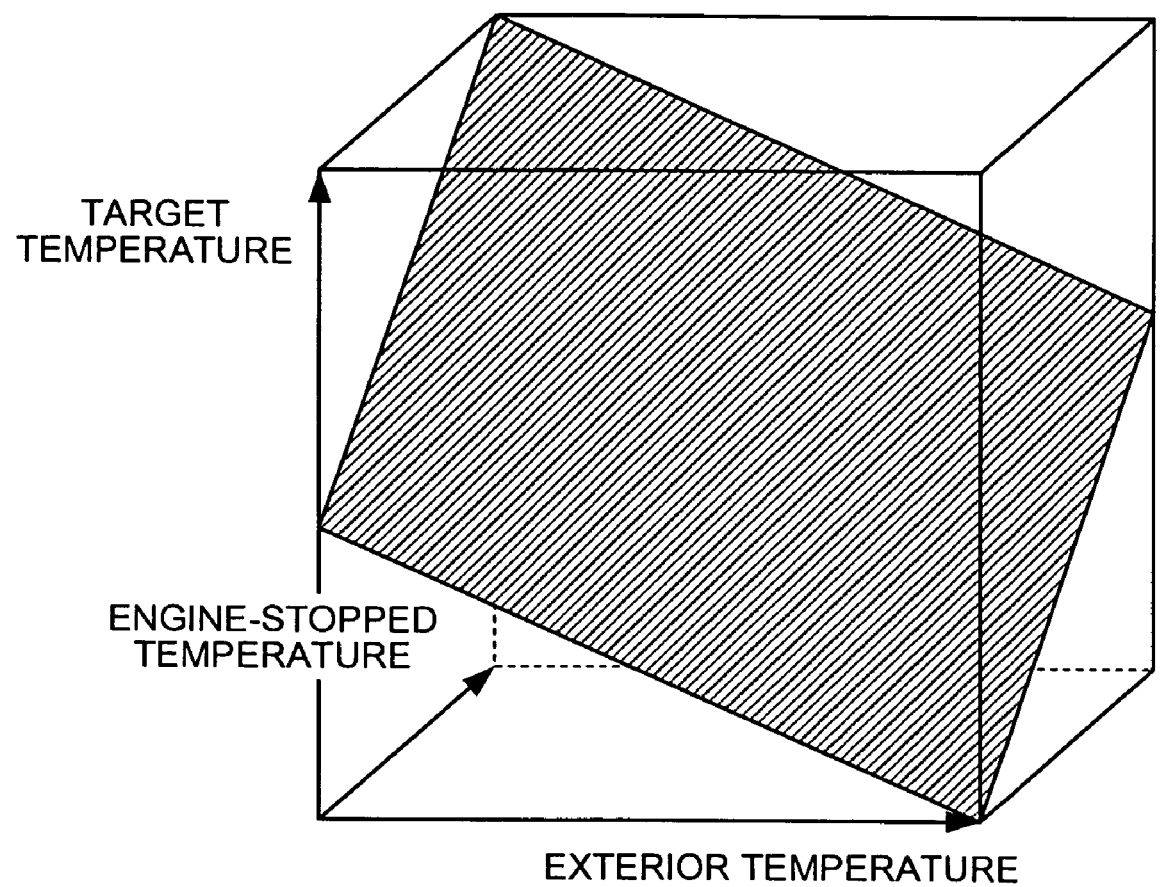
FIG. 13 is a flowchart for explaining a process procedure for setting a target vehicle interior temperature.

The target vehicle interior temperature is set as shown in FIG. 13 based on a predetermined temperature of the heating and cooling apparatus 3a (i.e., temperature predetermined when the engine is stopped) or the exterior temperature at the end of the last traveling (i.e., when the engine is stopped).

According to the present invention, the vehicle controller starts the power mechanism according to the remote starting control when a remote command to start the power mechanism of the vehicle is received. Therefore, advantageously, the vehicle controller for which fuel consumption and emissions of an exhaust gas are reduced can be obtained.

According to the present invention, the vehicle controller allows the power mechanism of the vehicle to work under the vehicle-ride waiting control differing from the riding control from the time at which a remote command to start the power mechanism is received. Therefore, advantageously, the vehicle controller for which fuel consumption and emissions of an exhaust gas are made smaller can be obtained.

According to the present invention, the vehicle controller allows the power mechanism to work under the riding control when a remote command to start the power mechanism is received, and switches to the vehicle-ride waiting control differing from the riding control when a predetermined condition is established, so that the power mechanism works under the vehicle-ride waiting control. Therefore, advantageously, the vehicle controller can be obtained for which air warming and air conditioning are finished early, and fuel consumption and emissions of an exhaust gas are reduced.

According to the present invention, after the remote command receiving unit receives the command to start the power mechanism and starts operating the power mechanism, the vehicle controller stops operating the power mechanism when a predetermined condition is established. Therefore, advantageously, the vehicle controller can be obtained for which air warming and air conditioning are finished early, and fuel consumption and emissions of an exhaust gas are made smaller.

According to the present invention, the remote command receiving unit receives a command to start the power mechanism and starts operating the power mechanism, and the vehicle controller sends a notice to the driver when a predetermined condition is established or when a predetermined condition is predicted to be established, and the vehicle controller prolongs stopping an operation of the power mechanism when a response is received within a predetermined time from the time at which the notice is sent. Therefore, advantageously, the vehicle controller can be obtained for which fuel consumption and emissions of an exhaust gas are reduced while performing appropriate operational control according to circumstances.

According to the present invention, the vehicle controller starts the engine of the vehicle at a lower number of engine revolutions than under the riding control when a remote command to start the engine is received. Therefore, advantageously, the vehicle controller can be obtained for which fuel consumption and emissions of an exhaust gas are reduced while operating the engine at necessary and sufficient power.

According to the present invention, when a remote command to start the engine of the vehicle is received, the vehicle controller allows the engine to run at a lower number of engine revolutions than under the riding control, and changes a threshold used to detect the occurrence of knocking and/or a quantity of corrections used to control the engine when the occurrence of knocking is detected. Therefore, advantageously, the vehicle controller can be obtained for which fuel consumption and emissions of an exhaust gas are reduced.

According to the present invention, when a remote command to start the engine of the vehicle is received, the vehicle controller supplies the engine with a lower concentration of fuel than under the riding control. Therefore, advantageously, the vehicle controller can be obtained for which fuel consumption and emissions of an exhaust gas are reduced while using lean-burn control.

According to the present invention, when a remote command to start the engine of the vehicle is received, the vehicle controller makes the number of ignition cylinders smaller than under the riding control. Therefore, advantageously, the vehicle controller can be obtained for which fuel consumption and emissions of an exhaust gas are reduced.

According to the present invention, when a remote command to start the engine of the vehicle is received, the vehicle controller does not perform a rise in the number of engine revolutions based on an operating state of the in-vehicle devices, a rise in the number of engine revolutions when the engine is started, and a rise in the number of engine revolutions when the temperature is low. Therefore, advantageously, the vehicle controller can be obtained for which fuel consumption and emissions of an exhaust gas are reduced while operating the engine at necessary and sufficient power.

According to the present invention, when a remote command to start the power mechanism of the vehicle is received, the vehicle controller starts the power mechanism, and obtains the temperature of cooling water, and changes the operational contents of the power mechanism based on the obtained temperature. Therefore, advantageously, the vehicle controller can be obtained for which fuel consumption and emissions of an exhaust gas are reduced while performing appropriate operational control according to the circumstances of the vehicle.

According to the present invention, when a remote command to start the power mechanism of the vehicle is received, the vehicle controller air-conditions the vehicle interior according to the remote starting control. Therefore, advantageously, the vehicle controller can be obtained for which air warming and air conditioning are performed while reducing fuel consumption and emissions of an exhaust gas.

According to the present invention, when a remote command to start the power mechanism of the vehicle is received, the vehicle controller starts the power mechanism, and obtains the vehicle interior temperature, and changes the operational contents of the power mechanism based on the obtained vehicle interior temperature. Therefore, advantageously, the vehicle controller can be obtained for which fuel consumption and emissions of an exhaust gas are reduced while performing appropriate operational control according to the circumstances of the vehicle interior.

According to the present invention, when a remote command to start the power mechanism of the vehicle is received, the vehicle controller starts the power mechanism, and obtains the temperature of the cooling water, and starts air-conditioning the vehicle interior when the obtained temperature of the cooling water reaches a predetermined water temperature. Therefore, advantageously, the vehicle controller can be obtained for which air warming is preferentially performed, and air conditioning is ready to be performed while reducing fuel consumption and emissions of an exhaust gas.

According to the present invention, when a remote command to start the power mechanism of the vehicle is received, the vehicle controller starts the power mechanism, and executes the operational control of vehicle windows, the operational control of curtains, and the power supply control of the in-vehicle devices. Therefore, advantageously, the vehicle controller can be obtained for which air-conditioning efficiency is raised, and hence fuel consumption and emissions of an exhaust gas are reduced.

According to the present invention, when a remote command to start the power mechanism of the vehicle is received, the vehicle controller starts the power mechanism according to the remote starting control, and ends the remote starting control when it is detected or predicted that the driver is riding in the vehicle. Therefore, advantageously, the vehicle controller can be obtained for which fuel consumption and emissions of an exhaust gas are reduced while performing appropriate operational control according to the circumstances of the vehicle.

According to the present invention, when the engine is remotely started, the vehicle controller operates the engine with diluted fuel while opening the throttle so as to lessen friction. Therefore, advantageously, the vehicle controller can be obtained for which fuel consumption and emissions of an exhaust gas are made smaller.

According to the present invention, when the engine is remotely started, the vehicle controller gradually dilutes the supply fuel while monitoring the number of engine revolutions, and increases the concentration of the supply fuel when an excessive fall in the number of engine revolutions exceeding a predetermined value is detected. Therefore, advantageously, the vehicle controller can be obtained for which fuel consumption and emissions of an exhaust gas are made smaller while preventing the engine from being stopped.

According to the present invention, when the engine is remotely started, the vehicle controller operates the engine under the exhaust gas recirculating control. Therefore, advantageously, the vehicle controller for which emissions are reduced can be obtained.

According to the present invention, when the engine is remotely started, the vehicle controller gradually increases a quantity of exhaust gas supplied to the engine while monitoring the number of engine revolutions, and decreases the quantity of exhaust gas supplied to the engine when an excessive fall in the number of engine revolutions exceeding a predetermined value is detected. Therefore, advantageously, the vehicle controller can be obtained for which emissions are reduced while preventing the engine from being stopped.

According to the present invention, when the engine is remotely started, the vehicle controller operates the engine under the variable valve timing control. Therefore, advantageously, the vehicle controller for which emissions are reduced can be obtained.

According to the present invention, when the engine is remotely started, the vehicle controller gradually increases the overlap time of the variable valve timing control while monitoring the number of engine revolutions, and decreases the overlap time when an excessive fall in the number of engine revolutions exceeding a predetermined value is detected. Therefore, advantageously, the vehicle controller can be obtained for which emissions are reduced while preventing the engine from being stopped.

According to the present invention, when the engine is remotely started, the vehicle controller ignites the engine at an advanced timing than under the riding control. Therefore, advantageously, the vehicle controller can be obtained for which fuel consumption and emissions of an exhaust gas are made smaller.

According to the present invention, when the engine is remotely started, the vehicle controller uses purge without waiting for the completion of fuel learning. Therefore, advantageously, the vehicle controller can be obtained for which purge is used even when the engine is remotely started, and fuel consumption and emissions of an exhaust gas are made smaller.

According to the present invention, when the engine is remotely started, the vehicle controller monitors the number of engine revolutions, and increases a ratio of the purge to the supply fuel until an excessive fall in the number of engine revolutions exceeding a predetermined value is detected. Therefore, advantageously, the vehicle controller can be obtained for which purge is used while preventing the engine from being stopped, and fuel consumption and emissions of an exhaust gas are made smaller.

According to the present invention, when the engine is remotely started, the vehicle controller stops a learning process in operating the engine. Therefore, advantageously, the vehicle controller can be obtained for which fuel consumption and emissions of an exhaust gas are reduced without affecting the operations performed when the driver is in the vehicle.

According to the present invention, when the direct fuel-injection engine is remotely started, the vehicle controller establishes a condition for entering a stratification combustion mode that differs from an entering condition of the riding control and enlarges an execution area of stratification combustion. Therefore, advantageously, the vehicle controller for the direct fuel-injection engine can be obtained for which fuel consumption and emissions of an exhaust gas are reduced.

According to the present invention, when the direct fuel-injection engine is remotely started, the vehicle controller enlarges an execution area of stratification combustion, and enlarges an execution area of rich spike by changing a condition for entering rich spike control. Therefore, advantageously, the vehicle controller for the direct fuel-injection engine can be obtained for which emissions are reduced.

According to the present invention, when the engine is remotely started, the vehicle controller automatically sets a target vehicle interior temperature, and controls a target fall in the number of engine revolutions based on a difference between the target vehicle interior temperature and the vehicle interior temperature. Therefore, advantageously, the vehicle controller can be obtained for which fuel consumption and emissions of an exhaust gas are reduced while maintaining a comfortable temperature obtained in riding in the vehicle by preferentially performing air conditioning.

According to the present invention, when the engine is remotely started, the vehicle controller automatically sets a target vehicle interior temperature, and lessens the number of engine revolutions based on a difference between the target vehicle interior temperature and the vehicle interior temperature, and stops lessening the number of engine revolutions when an excessive fall exceeding a predetermined value is detected. Therefore, advantageously, the vehicle controller can be obtained for which fuel consumption and emissions of an exhaust gas are reduced while maintaining a comfortable temperature obtained in riding in the vehicle by preferentially performing air conditioning and while preventing the engine from being stopped.

According to the present invention, when the engine is remotely started, the vehicle controller automatically sets a target vehicle interior temperature by using the exterior temperature and using a predetermined temperature of the air conditioning unit when the vehicle is stopped, and controls a target fall in the number of engine revolutions of the engine based on a difference between the target vehicle interior temperature and the vehicle interior temperature. Therefore, advantageously, the vehicle controller can be obtained for which fuel consumption and emissions of an exhaust gas are made smaller while maintaining a comfortable temperature obtained in riding in the vehicle by preferentially performing air conditioning.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle controller that controls operations of a vehicle, comprising:
   a remote command receiving unit that receives a remote command related to starting a power mechanism of the vehicle; and
   a remote starting control unit that starts and operates the power mechanism under a waiting control, which is different from a riding control, upon the remote command receiving unit receiving the remote command, wherein the power mechanism is an engine, and
   the waiting control includes running the engine at a number of revolutions that is lower than that in the riding control.

2. The vehicle controller according to claim 1, wherein the remote starting control unit operates the power mechanism under a riding control upon the remote command receiving unit receiving the remote command, and the remote starting control unit switches to a waiting control, which is different from the riding control, upon a predetermined condition is satisfied so as to operate the power mechanism under the waiting control.

3. The vehicle controller according to claim 2, further comprising a cooling-water temperature-measuring unit that measures a temperature of cooling water of the power mechanism, wherein
   the predetermined condition is a relation between the temperature measured by the cooling-water temperature-measuring unit and a predetermined value.

4. The vehicle controller according to claim 3, further comprising an air conditioning unit that air-conditions inside of a compartment of the vehicle, wherein
   the remote starting control unit controls an operation of the air conditioning unit.

5. The vehicle controller according to claim 4, further comprising a vehicle-temperature measuring unit that measures temperature in the compartment, wherein
   the predetermined condition is a relation between the temperature measured by the vehicle-temperature measuring unit and a predetermined value.

6. The vehicle controller according to claim 4, wherein the remote starting control unit starts and operates the power mechanism upon the remote command receiving unit receiving the remote command, and starts and operates the air conditioning unit upon the temperature detected by the cooling-water temperature-measuring unit reaching a predetermined value.

7. The vehicle controller according to claim 1, wherein when a predetermined condition is satisfied while the power mechanism is operating, the remote starting control unit stops the power mechanism.

8. The vehicle controller according to claim 7, further comprising a notifying unit that outputs a notification that informs a driver of the vehicle about a state of the vehicle, wherein
   the remote starting control unit causes the notifying unit to output the notification upon determining satisfaction of the predetermined condition or upon estimating that the predetermined condition is going to be satisfied, and
   the remote starting control unit delays stopping the operation of the power mechanism upon receiving a response from the driver during a predetermined time that is counted from the output of the notification by notifying unit.

9. The vehicle controller according to claim 7, further comprising a cooling-water temperature-measuring unit that measures a temperature of cooling water of the power mechanism, wherein
   the predetermined condition is a relation between the temperature measured by the cooling-water temperature-measuring unit and a predetermined value.

10. The vehicle controller according to claim 9, further comprising an air conditioning unit that air-conditions inside of a compartment of the vehicle, wherein
    the remote starting control unit controls an operation of the air conditioning unit.

11. The vehicle controller according to claim 10, further comprising a vehicle-temperature measuring unit that measures temperature in the compartment, wherein
    the predetermined condition is a relation between the temperature measured by the vehicle-temperature measuring unit and a predetermined value.

12. The vehicle controller according to claim 10, wherein the remote starting control unit starts and operates the power mechanism upon the remote command receiving unit receiving the remote command, and starts and operates the air conditioning unit upon the temperature detected by the cooling-water temperature-measuring unit reaching a predetermined value.

13. The vehicle controller according to claim 1, further comprising a knocking detecting unit that detects whether the engine is knocking based on a threshold, wherein
the waiting control includes, while the engine is operating under the waiting control, changing at least one of the threshold and a parameter for corrections used to control the engine when the knocking detecting unit that detects that the engine is knocking.

14. The vehicle controller according to claim 1, wherein the power mechanism is an engine, and
the waiting control includes running the engine at a concentration of fuel that is lower than that in the riding control.

15. The vehicle controller according to claim 1, wherein the power mechanism is an engine with a plurality of cylinders, and
the waiting control includes running the engine with number of cylinders that is lower than that in the riding control.

16. The vehicle controller according to claim 1, wherein the power mechanism is an engine, and
the waiting control includes controlling at least one of a rise in number of revolutions of the engine due to operation of an in-vehicle device, a rise in an amount of fuel supplied to the engine when the engine is started, and a rise in an amount of fuel supplied to the engine when a temperature of the engine is low.

17. The vehicle controller according to claim 1, wherein the remote starting control unit further executes at least one of operation control of a vehicle window, a curtain, and a power supply of an in-vehicle device.

18. The vehicle controller according to claim 1, further comprising a vehicle-ride detecting unit performs at least one of detecting whether a driver is in the vehicle and estimating that the driver is going to enter the vehicle, wherein
the remote starting control unit does not start the power mechanism upon the vehicle-ride detecting unit detecting that the driver is in the vehicle or estimating that the driver is going to enter the vehicle.

19. The vehicle controller according to claim 1, wherein the power mechanism is an engine, and
the waiting control includes controlling a throttle of the engine and diluting the fuel.

20. The vehicle controller according to claim 1, wherein the waiting control includes gradually diluting the fuel while monitoring a number of revolutions of the engine, and increasing a concentration of fuel supplied to the engine when the number of revolutions fall below a predetermined value.

21. The vehicle controller according to claim 1, wherein the power mechanism is an engine, and
the waiting control includes re-supplying to the engine an exhaust gas emitted from the engine.

22. The vehicle controller according to claim 21, wherein the waiting control includes gradually increasing an amount of the exhaust gas re-supplied to the engine while monitoring number of revolutions of the engine, and decreasing the amount of the exhaust gas re-supplied to the engine when the number of revolutions fall below a predetermined value.

23. The vehicle controller according to claim 1, wherein the power mechanism is an engine, and
the waiting control includes controlling a timing of opening and closing of at least one of an intake valve and an exhaust valve of the engine.

24. The vehicle controller according to claim 23, wherein the waiting control includes gradually increasing duration of time during which both the intake valve and the exhaust valve are simultaneously opened while monitoring number of revolutions of the engine, and shortening the duration when the number of revolutions fall below a predetermined value.

25. The vehicle controller according to claim 1, wherein the power mechanism is an engine, and
the waiting control includes advancing an ignition timing of the engine.

26. The vehicle controller according to claim 1, wherein the power mechanism is an engine, and
the waiting control includes supplying purge independently of fuel learning.

27. The vehicle controller according to claim 26, wherein the waiting control includes monitoring number of revolutions of the engine, and increasing a ratio of the purge to the fuel until the number of revolutions falls below a predetermined value.

28. The vehicle controller according to claim 1, wherein the power mechanism is an engine, and
the waiting control includes stopping a process for learning in operating the engine.

29. The vehicle controller according to claim 1, wherein the power mechanism is a direct fuel-injection engine, and
the waiting control includes setting condition for entering a stratification combustion mode that are different from that of the riding control and enlarging an execution area of stratification combustion.

30. The vehicle controller according to claim 29, wherein the waiting control includes changing a condition for entering rich spike control in the stratification combustion mode, and enlarging an execution area of rich spike.

31. The vehicle controller according to claim 1, further comprising:
an air conditioning unit that air-conditions inside of a compartment of the vehicle; and
a vehicle temperature measuring unit that measures temperature in the compartment, wherein
the power mechanism is an engine, and
the remote starting control unit sets a target temperature, and controls fall in number of revolutions of the engine based on a difference between the target temperature and the temperature measured by the vehicle temperature measuring unit.

32. The vehicle controller according to claim 31, wherein the waiting control includes increasing the fall in the number of revolutions while monitoring the number of revolutions, and decreasing the fall in the number of revolutions when the number of revolutions fall below a predetermined value.

33. The vehicle controller according to claim 31, further comprising:
a storing unit that stores therein a predetermined temperature of the air conditioning unit when the vehicle is stopped; and
an exterior temperature measuring unit that measures a temperature outside of the compartment, wherein
the remote starting control unit sets the target temperature based on the predetermined temperature stored in the storing unit and the temperature measured by the exterior temperature measuring unit.

34. A vehicle controller comprising:

a remote input receiving unit that receives a remote command for starting an engine of a vehicle; and an operation determining unit that controls a start of the engine in response to the remote command or an operation of an ignition key for starting the engine, wherein the operation determining unit controls the engine a different numbers of revolutions depending on whether the start of the engine is instructed by the remote command or the ignition key.

35. A method for starting an engine of a vehicle, comprising:

receiving a remote command for starting the engine:

receiving an instruction based on operation of an ignition key;

determining whether the start of the engine is instructed by the remote command or the ignition key; and starting and controlling the engine at different numbers of revolutions depending on a result of the determining step.

* * * * *